United States Patent Office 3,559,165
Patented Jan. 26, 1971

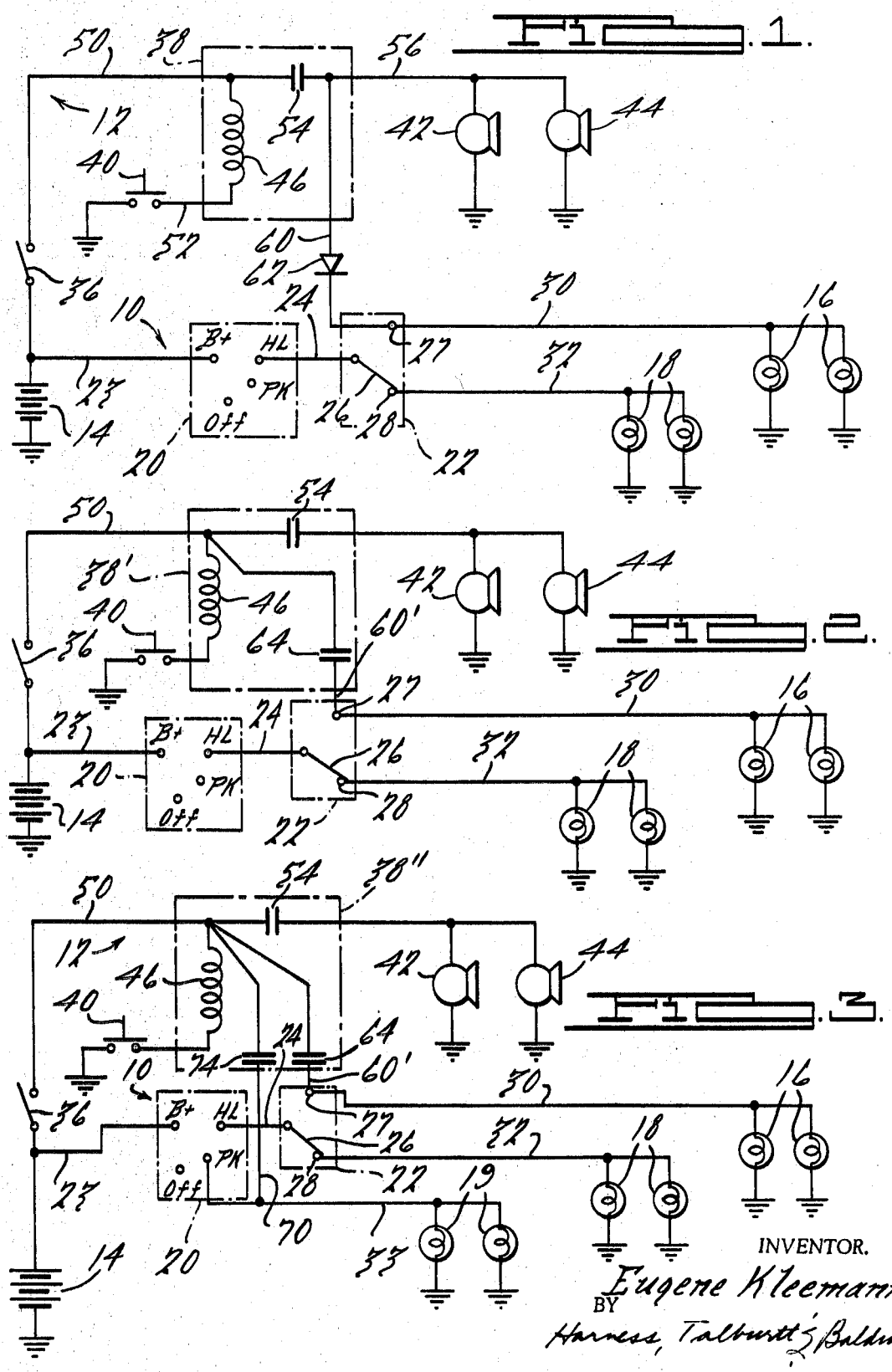

3,559,165
OPTICAL-AUDIO WARNING SYSTEM
Eugene Kleemann, Detroit, Mich., assignor to Chrysler Corporation, Highland Park, Mich., a corporation of Delaware
Filed Oct. 17, 1968, Ser. No. 768,273
Int. Cl. B60q 1/14, 5/00
U.S. Cl. 340—75                              3 Claims

ABSTRACT OF THE DISCLOSURE

An optical-horn signalling system for automotive vehicles equipped with customary horn and multiple beam headlighting circuits and wherein operation of the horn flashes one of the headlight beam circuits when the vehicle headlight switch is open and also when the vehicle is operated with the other headlight beam circuit energized.

BACKGROUND

This invention relates to horn and lighting systems for automotive vehicles, and, more particularly, to electrical circuits for conjointly effecting or deriving substantially simultaneously produced audible and visible warning signals from the usual horns, lights and controls customarily provided on automotive vehicles.

PRIOR ART

Slight reflection will readily indicate the desirability of providing combined optical visual warning signals for automotive vehicles operated under various weather, road and ambient lighting conditions.

With continuing improvements in vehicle sound insulation and the increasing use of air conditioning and other modern vehicle accessories, there is an increasing tendency to operate such vehicles with the windows closed or shut, thereby greatly reducing the effectiveness of an audible warning device. Even at medium road speeds, the road noise is sufficiently high to effectively mask or "drown out" the sound of the horn of another vehicle, especially on overtaking and passing.

Such audio-visual warning devices as have been proposed heretofore are ineffective to provide combined warning signals for both day and night operating conditions. Moreover, they generally require the addition of special manipulating selector and associated control elements, the incorporation of which involves considerable expense and disruption of the vehicle wiring circuitry.

Accordingly, the present invention has for its objects to provide a conveniently operated combined optical horn warning system capable of concurrently providing audible and visual warning signals for both day and night operating conditions.

Another object is to provide a simple and inexpensive circuit arrangement that is readily adapted for incorporation in motor vehicles for simultaneously producing optical-audio warning signals.

Related objects are to provide improved circuit structure for concurrently producing combined audible and visible warning signals from the usual horns, lights and controls provided on a vehicle without the addition of further operating controls nor disruption of existing vehicle wiring.

Another object is to provide an optical horn warning system of the above character suitable for use with vehicles equipped with concealed headlamps.

Other objects together with the advantages of the present invention will appear more fully from the following detailed description of the preferred embodiments of the invention following the below presented.

Description of the drawings in which:

FIG. 1 is an electrical wiring diagram of one form of optical horn circuit arrangement in accordance with the present invention.

FIG. 2 is an electrical wiring diagram of an alternate form of optical-horn circuit arrangement; and FIG. 3 is an electrical wiring diagram of an optical horn circuit arrangement as may be employed with vehicles equipped with concealed headlamps.

With reference to the drawings, there is shown in FIG. 1 an electrical wiring diagram for a vehicle including a lighting circuit 10 and a horn circuit 12 both energizable or powered from the vehicle battery 14 or generating system.

The lighting circuit 10 includes high beam and low-beam headlamps indicated respectively at 16 and 18, the usual vehicle headlight control switch 20 and a beam changing or selector switch such as the customary foot-operated dimmer switch 22. The headlight or main control switch 20 is the customary parking light-headlight selector switch that is manipulatively selectively operable from an "off" to a parking lights position and to a headlights position and is functionally shown herein for purposes of simplification. Conductor 23 connects one side or the B+ terminal of the switch 20 to the positive terminal of the negatively grounded battery. The headlight terminal side of the switch is shown connected over conductor 24 to the movable contact arm 26 of the dimmer switch 22 which is movable or operable between a spaced pair of fixed contacts 27 and 28.

Contact terminal 27 is the high beam lighting circuit selector contact and is connected over conductor 30 to one side of each of the parallel connected high beam filaments or headlamps 16, the other side of each of which is returned to ground. Contact terminal 28 is the low beam lighting circuit selector contact of the dimmer switch and is connected over conductor 32 to one side of each of the parallel connected low beam filaments or headlamps 18, the other side of each of which is returned to ground.

The horn circuit 12 is shown connected to the positive terminal of the vehicle storage battery through the vehicle ignition switch 36 and includes a horn relay 38, grounding type horn switch 40, and one or more electro-magnetically actuated acoustical horns 42 and 44, two of which are shown herein. One side of the coil 46 of the horn relay is connected to conductor 50 which is elevated to B+ or battery potential whenever the ignition switch 36 is closed or positioned in its accessories or "ON" positions. The other side of the horn relay coil 46 is connected by conductor 52 through the grounded horn switch 40. Operator actuation of the horn switch (button) energizes the horn relay coil to close an associated set of normally open, current carrying contacts 54 completing a series energizing circuit from the battery, conductor 50, relay contacts 54 and conductor 56 to one terminal of the horns that are returned electrically to ground, thereby sounding the horns.

In accordance with the invention, the vehicle horn circuit and a portion of the vehicle headlighting circuit are interconnected by an electrical circuit extending from the horn relay to the high beam headlighting circuit to energize the latter through the horn circuit when the horn relay is energized through the horn operating control switch.

In FIG. 1 the interconnecting circuit extends from the output or horn connected side of the horn relay over conductor 60 to the high beam terminal contact 27 of the dimmer switch 22, whereby the high beam lighting circuit will be energized coincident or concurrently with the sounding of the horns regardless of the position of the main control or headlight switch 20. In order to prevent back feed of current from the high beam lighting circuit to the horn circuit when the high beam lighting circuit is connected to the battery through the dimmer switch and the headlight control switch, a unidirectional conducting circuit element, such as a rectifier or diode 62, poled as shown, is provided in the circuit interconnecting the horn and the high beam lighting circuit.

It will be seen that the aforementioned circuit arrangement provides a momentary energization of the high beam filaments or headlamps during the day, as well as night time operating conditions, since the vehicle is normally operated with low beam headlights at night when driving in the city, and with dimmed lights when driving at night behind a vehicle being overtaken and about to be passed from the rear.

The diode 62 may be replaced by another set of relay contacts 64 operated from the same horn relay or by another horn relay whose operating coil is connected to circuit conductors 50 and 52 or in parallel with that of the relay 36. In order to reduce the current carrying capacity of the relay contacts, the contacts ought preferably to be connected as shown in FIG. 2. This arrangement provides some slight additional advantage in the further event that the first set of relay contacts 54 should fail in their open position, whereby the second set of contacts 64 could still be available to provide an optical warning signal upon actuation of the horn switch 40.

FIG. 3 illustrates an optical-audio warning system utilizing the principles and concepts of the invention as applied to a vehicle equipped with headlamps that are concealed or covered whenever the main light control switch 20 is open or off. In such case, the normally exposed or uncovered parking lamps shown at 19 can be employed to provide an exposed visual signal with the sounding of the horns when the main light control switch is turned off and the vehicle headlamps are covered. An additional parallel type circuit connection 70 including an additional set of normally open relay operated contacts 74 extends to the parking light circuit conductor 33 from the parking light terminal P of the main lighting control switch 20 connected to the parking lamps 19 returned to ground. The contacts 74 may be provided on the horn relay 38 or associated with another horn relay whose operating coil is connected in parallel with coil 46. Alternatively, in place of the contacts 64 and 74 diodes could be employed.

Under these conditions, the parking lamps will be flashed in conjunction with the sounding of the horns when the main light switch 20 is off. The parking lamps and/or the high beam headlamps will be flashed conjointly with the sounding of the horns when the main lighting control switch is in a light operating condition or position and the dimmer switch 22 is connected to select the low beam lighting circuit.

It will be seen that the incorporation of the system into an existing vehicle wiring circuit is relatively simple and inexpensive and utilizes only a simple wiring interconnection through a diode or auxiliary set of relay contacts to one of the beam lighting circuits of a vehicle equipped with high beam and low beam driving lamps. As the circuit connection is essentially a parallel type connection from the horn circuit and extends between available terminal connection points of the existing vehicle wiring circuit, no disruption of the wiring circuitry is involved. The incorporation of the horn and interconnecting lighting circuit or circuits does not involve or require the use of additional selector or manipulative controls and uses only the existing operator controls which are operated in their normal customary manner.

It will be appreciated that such an audio-visual warning device is more likely to attract attention of pedestrians and driving traffic, since the audible signal is reinforced by the additionally or conjointly produced visual signal which in many instances is more attention attracting. The flashing of the headlamps, especially on high beam, is very effective at night, and even in daylight to both oncoming or approaching vehicle traffic directly viewing or exposed to the flashing beam from the signalling vehicle as well as to a vehicle that is being overtaken from behind that will receive a flashing beam reflected in the rear view mirror thereof.

In addition to the above and other apparent advantages of the above-described system, the operators of vehicles equipped with such an optical-horn signalling system will be more likely to operate their vehicles with the headlamps on low beam position in order to have the combined optical audio signals available when driving at night, particularly in the city.

What is claimed is:

1. In a motor vehicle, the combination of:
   a source of electrical power;
   a vehicle lighting circuit including:
      a high beam headlight circuit,
      a low beam headlight circuit,
      a beam selector switch operable between a high beam circuit contact and low beam circuit contact, and
      a headlight control switch connected directly between said electrical source and said beam selector switch and operable between a circuit disabling and a circuit enabling condition connecting a headlight beam circuit selected by the beam selector switch to said electrical power source;
   a vehicle horn circuit including:
      an electric horn and
      a horn switch controlling the energization of the horn from said source; and
      circuit means interconnecting the vehicle horn circuit to said high beam headlight circuit to energize the latter from and through the horn circuit regardless of the condition of the headlight control switch, while preventing energization of the horn circuit from the vehicle lighting circuit whenever said high beam headlight circuit is connected to said source through the beam selector switch, said circuit means comprising:
         a single circuit conductor extending from a point in the horn circuit between the horn switch and the horn to the high beam circuit contact of the beam selector switch and a diode in series with said conductor and poled in a direction to prevent forward current flow from the high beam headlight circuit to the horn circuit.

2. In a motor vehicle, the combination of:
   a source of electrical power;
   a vehicle lighting circuit including:
      a high beam headlight circuit,
      a low beam headlight circuit,
      a beam selector switch operable between a high beam circuit contact and low beam circuit contact, and
      a headlight control switch connected directly between said electrical source and said beam selector switch and operable between a circuit disabling and a circuit enabling condition connecting a headlight beam circuit selected by the beam selector switch to said electrical power source; and
   a vehicle horn circuit including:
      an electric horn,
      a horn switch, and
      a horn relay including:
         a relay coil energizable from the source through the horn switch and at least two sets of normally open switch contacts operated by the horn relay,
      one of said sets of horn relay switch contacts connected in energizing control relation from said source to said horn, the other of said sets of horn relay switch contacts connected in energizing control relation from said source by one conductor to the high beam circuit contact of said beam selector switch for energization of the high beam headlight circuit upon actuation of the horn switch regardless of the condition of the headlight control switch, while preventing energization of the horn circuit from the vehicle lighting circuit whenever the high beam headlight circuit is connected to the source of power through the beam selector switch and the headlight control switch.

3. The invention in accordance with claim 2 wherein said vehicle lighting circuit also includes a parking light circuit and the headlight control switch is operable to connect the parking light circuit to the source of power and wherein said horn relay includes a third set of normally open switch contacts operated by the same relay, said third set of horn relay switch contacts connected to the vehicle parking light circuit for energization thereof from the horn circuit, but preventing energization of the horn circuit from the parking light circuit whenever the parking light circuit is connected to the source of power through the headlight control switch.

References Cited

UNITED STATES PATENTS

| | | | |
|---|---|---|---|
| 1,909,072 | 5/1933 | Prescott | 340—76UX |
| 3,436,728 | 4/1969 | Silverwood et al. | 340—75 |

DONALD J. YUSKO, Primary Examiner

K. N. LEIMER, Assistant Examiner

U.S. Cl. X.R.

340—76